J. G. WAINWRIGHT.
SLIDING BOLT.
APPLICATION FILED JAN. 17, 1910.

964,948.

Patented July 19, 1910.

Witnesses
J. K. Moore
R. E. Barry.

Inventor
John George Wainwright
Whitaker Prevost Attys.

UNITED STATES PATENT OFFICE.

JOHN GEORGE WAINWRIGHT, OF LONDON, ENGLAND.

SLIDING BOLT.

964,948.  Specification of Letters Patent.  Patented July 19, 1910.

Application filed January 17, 1910. Serial No. 538,473.

*To all whom it may concern:*

Be it known that I, JOHN GEORGE WAINWRIGHT, a subject of the King of Great Britain, residing at 39 Lombard street, London, England, have invented new and useful Improvements in Sliding Bolts, of which the following is a specification.

My invention relates to sliding bolts of the kind used for securing hinged or sliding doors, windows or the like, and comprises means for positively locking the bolts proper against movement.

According to my invention the handle of a bolt has arranged in conjunction with it a sliding pin designed to be protruded laterally from the bolt proper so as to engage with the plate or frame in which the said bolt proper slides, the said pin being combined with a lever or thumb-piece pivoted in the handle of the bolt. A spring is arranged in conjunction with the lever or thumb-piece in such a manner as to cause the sliding pin to project into the slot or notch on the frame or plate and the end of the lever to project beyond the surface of the handle. The projecting end of the lever or thumb-piece is arranged in such a position upon the handle that when the latter is grasped to move the bolt the said projecting end will be pressed back into the handle against the pressure of the spring, so as to cause the lever to draw the sliding pin out of engagement with the slot in the plate or framing.

To enable my invention to be fully understood I will describe the same by reference to the accompanying drawing, in which—

Figure 1:
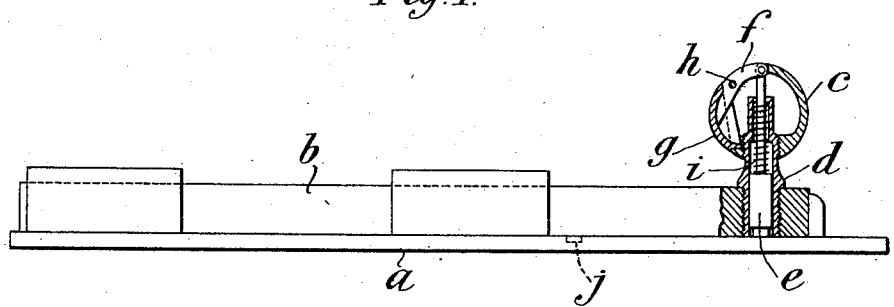
Figure 2:
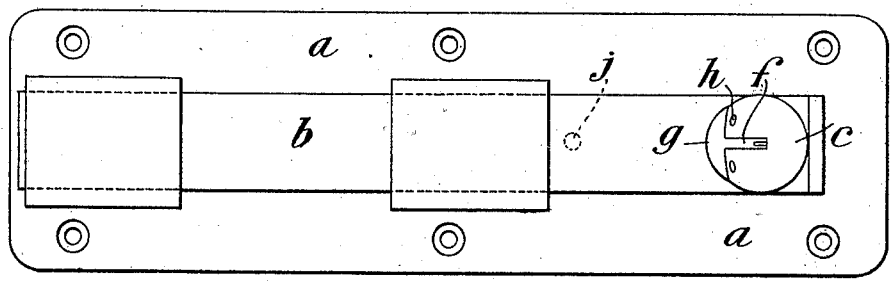
Figure 3:
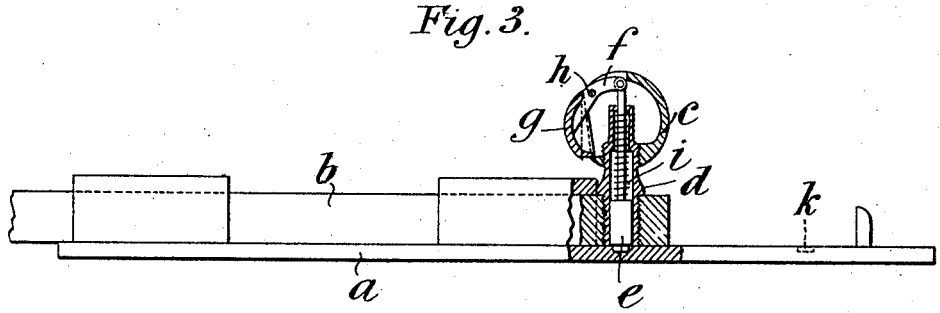

Figure 1 is a sectional side elevation of a sliding bolt provided with my improvement, and Fig. 2 is a plan of the same. Fig. 3 is a view similar to Fig. 1, but showing the bolt in its shut or protruding position.

*a* indicates the frame of the bolt, *b* the bolt proper which, as shown, is of rectangular section, and *c* the knob or handle for operating the bolt, the said knob being, for the purpose of my invention, made hollow and provided with a hollow stem *d*.

*e* is the sliding pin by means of which the bolt can be locked, the said pin being arranged in the hollow stem *d* and being connected at its upper or outer end to the lever *f* of the thumb-piece *g* which is pivoted upon a pin *h* and arranged so that its surface is practically continuous with the surface of the knob or handle *c*.

*i* is a spiral spring which surrounds the shank or stem of the locking pin *e*, and the action of which is to cause the said pin to project laterally from the bolt so that upon the movement of the bolt the said pin *e* is brought into coincidence with the hole or slot *j* formed in the plate *a*, the said pin entering the said hole and locking the bolt proper against movement.

When the knob *c* is grasped to draw back the bolt the pressure of the thumb upon the thumb-piece *g* will move the said thumb-piece inward and so lift the locking pin *e* out of engagement with the hole or slot *j* the bolt then being free to be moved in the ordinary manner.

It will be understood that the handle instead of being of spherical shape as shown may be of any other suitable shape.

If desired a second slot *k* into which the pin *e* will drop when the bolt is withdrawn may be provided in the plate *a* as indicated in Fig. 3, this latter arrangement being advantageously employed in a bolt designed to be fixed in a vertical position for preventing the bolt from dropping by reason of its weight.

Having now particularly described and ascertained the nature of my said invention and in what manner the same is to be performed, I declare that what I claim is—

1. A sliding bolt comprising a main frame, a bolt adapted to slide upon said frame, a locking pin mounted on said bolt, a spring to cause said pin to engage the frame at predetermined points and a movable device for retracting said pin, said device being adapted to be moved by pressure applied at an angle to the said pin against the force of the said spring.

2. In a sliding bolt the combination with the bolt proper of a locking pin adapted to engage with a hole or slot in the bolt frame under the action of a spring, and to be disengaged from the said slot by the compression of a thumb-piece forming part of the knob or handle by means of which the bolt is operated, said thumb-piece being operatively connected with said locking pin by a lever pivoted in said knob, substantially as, and for the purpose, described.

JOHN GEORGE WAINWRIGHT.

Witnesses:
JOHN E. BOUSFIELD,
C. G. REDFERN.